United States Patent
Okuyoshi et al.

(10) Patent No.: US 11,031,617 B2
(45) Date of Patent: Jun. 8, 2021

(54) FUEL CELL SYSTEM AND INJECTION CONTROL METHOD

(71) Applicant: TOYOTA JIDOSHA KABUSHIKI KAISHA, Toyota (JP)

(72) Inventors: Masahiro Okuyoshi, Okazaki (JP); Toshihiro Egawa, Okazaki (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 262 days.

(21) Appl. No.: 16/004,626

(22) Filed: Jun. 11, 2018

(65) Prior Publication Data

US 2018/0366753 A1    Dec. 20, 2018

(30) Foreign Application Priority Data

Jun. 14, 2017  (JP) ............................. JP2017-116625

(51) Int. Cl.
*H01M 8/1007*    (2016.01)
*H01M 8/0267*    (2016.01)
*H01M 8/0432*    (2016.01)
*H01M 8/04089*   (2016.01)
*H01M 8/04746*   (2016.01)
*H01M 8/0438*    (2016.01)
(Continued)

(52) U.S. Cl.
CPC ....... *H01M 8/1007* (2016.02); *H01M 8/0267* (2013.01); *H01M 8/0432* (2013.01); *H01M 8/0438* (2013.01); *H01M 8/04089* (2013.01); *H01M 8/04574* (2013.01); *H01M 8/04746* (2013.01); *H01M 8/04753* (2013.01); *H01M 2008/1095* (2013.01)

(58) Field of Classification Search
CPC combination set(s) only.
See application file for complete search history.

(56) References Cited

U.S. PATENT DOCUMENTS

2009/0029226 A1    1/2009  Yamagishi et al.
2009/0081492 A1*   3/2009  Hasuka ............ H01M 8/04686
                                              429/429
(Continued)

FOREIGN PATENT DOCUMENTS

JP    2008-146923    6/2006
JP    2007-194189    8/2007
JP    2010-267551    11/2010

*Primary Examiner* — Ula C Ruddock
*Assistant Examiner* — Sarika Gupta
(74) *Attorney, Agent, or Firm* — Finnegan, Henderson, Farabow, Garrett & Dunner, LLP

(57) ABSTRACT

A fuel cell system installed in a mobile body comprises; a fuel cell; a gas supply flow path; an injection device provided on the gas supply flow path; a pressure regulating valve configured to be provided more on an upstream side than the injection device on the gas supply flow path, and to autonomously perform an opening/closing operation in accordance with a difference between pressure between the pressure regulating valve and the injection device on the gas supply flow path and pressure on an upstream side of the pressure regulating valve; and a control unit configured to control injection of the reaction gas by the injection device. The control unit calculates an injection interval of the injection device based on an upper limit operation count of the pressure regulating valve set in advance with respect to a predetermined traveling distance of the mobile body.

7 Claims, 6 Drawing Sheets

(51) Int. Cl.
*H01M 8/04537* (2016.01)
*H01M 8/1018* (2016.01)

(56) References Cited

U.S. PATENT DOCUMENTS

| | | | |
|---|---|---|---|
| 2010/0167142 A1* | 7/2010 | Saito | B60L 15/2009 |
| | | | 429/429 |
| 2010/0239935 A1 | 9/2010 | Katano | |
| 2016/0056484 A1* | 2/2016 | Mizumoto | B60L 50/51 |
| | | | 429/429 |
| 2017/0274902 A1* | 9/2017 | Kumada | B60W 10/10 |

\* cited by examiner

Fig.5

| | | OUTPUT CURRENT | |
|---|---|---|---|
| | | SMALL | LARGE |
| VEHICLE SPEED | HIGH | ·INJECTION DUTY CYCLE:SHORT<br>·INJECTION INTERVAL:SHORT | ·INJECTION DUTY CYCLE:LONG<br>·INJECTION INTERVAL:SHORT |
| | LOW | ·INJECTION DUTY CYCLE:SHORT<br>·INJECTION INTERVAL:LONG | ·INJECTION DUTY CYCLE:LONG<br>·INJECTION INTERVAL:LONG |

# FUEL CELL SYSTEM AND INJECTION CONTROL METHOD

CROSS-REFERENCE TO RELATED APPLICATIONS

The present application claims priority based on Japanese patent application No. 2017-116625 filed on Jun. 14, 2017, the disclosure of which is hereby incorporated by reference in its entirety.

BACKGROUND

FIELD

The present disclosure relates to an injection device that injects reaction gas used in a fuel cell.

RELATED ART

Some currently used fuel cell systems have the following configuration. Specifically, an injection device and a pressure regulating valve are provided to a flow path for supplying reaction gas to a fuel cell. The injection device injects the reaction gas. The pressure regulating valve is provided more on an upstream side than the injection device. An example of the injection device includes an injector that injects hydrogen gas serving as fuel gas, stored in a tank, toward a downstream side. An example of the pressure regulating valve includes a mechanical regulator that has a valve body and autonomously opens/closes the flow path, for supplying the reaction gas, in accordance with upstream pressure (primary pressure) and downstream pressure (secondary pressure), to maintain the downstream pressure at a predetermined pressure. In a fuel cell system disclosed in JP 2007-194189A, a current sensor detects a current value of a fuel cell generating power. With the current value, an operation status of the fuel cell is determined and used for controlling an operation status of the injector (specifically, a gas injection timing and a gas injection time period). With this configuration, the fuel gas can be supplied with improved responsiveness.

When the injection device injects the reaction gas, the upstream pressure of the injection device, that is, the secondary pressure drops. As a result, the pressure regulating valve autonomously (passively) performs the opening operation. Thus, the operation of the pressure regulating valve is linked with the injection operation of the injection device. In JP 2007-194189A, the operation status of the injector is controlled based on the operation status of the fuel cell. This control does not take an upper limit operation count, that is, an allowable count of the operation of the pressure regulating valve into consideration. For this reason, the total operation count of the pressure regulating valve, the operation of which is linked with the operation of the injector, might exceed an upper limit operation count depending on the operation status of the fuel cell.

A long driving interval of the injector may be set to prevent the operation count of the pressure regulating valve from exceeding the upper limit operation count. However, with such a long driving interval, the hydrogen gas fails to be injected in accordance with the operation status of the fuel cell, and the fuel efficiency might be compromised as described below. Specifically, when a long driving interval is set for the injector, the hydrogen gas is injected for a longer period of time than in a case where a short driving interval is set, assuming that an injection duty cycle (a rate of the injection time to each interval) is the same. As a result, the pressure on the downstream side of the injector, that is, anode-side hydrogen partial pressure of the fuel cell rises. This leads to a large difference between the anode-side hydrogen partial pressure and the cathode-side hydrogen partial pressure in the fuel cell. This results in an increased flowrate (crossover flowrate) of the hydrogen gas that moves from the anode side to the cathode side through an electrolyte membrane and does not contribute to the electrochemical reaction in the fuel cell. Thus, the fuel efficiency is compromised.

The same applies to fuel cell systems installed in any mobile body other than vehicles, such as ships and aircrafts. In view of the aforementioned, a technique has been called for that can prevent fuel efficiency of reaction gas from being compromised, while preventing the total operation count of the pressure regulating valve from exceeding the upper limit operation count.

SUMMARY

According to one aspect of the present disclosure, there is provided a fuel cell system installed in a mobile body. The fuel cell system comprises a fuel cell configured to generate power by using reaction gas; a gas supply flow path through which the reaction gas is supplied to the fuel cell; an injection device configured to be provided on the gas supply flow path and to inject the reaction gas; a pressure regulating valve configured to be provided more on an upstream side than the injection device on the gas supply flow path, and to autonomously perform an opening/closing operation in accordance with a difference between pressure between the pressure regulating valve and the injection device on the gas supply flow path and pressure on an upstream side of the pressure regulating valve; and a control unit configured to control injection of the reaction gas by the injection device. The control unit may calculates an injection interval of the injection device based on an upper limit operation count of the pressure regulating valve set in advance with respect to a predetermined traveling distance of the mobile body.

BRIEF DESCRIPTION OF DRAWINGS

FIG. 5 is a diagram illustrating relationship between levels of the vehicle speed and the output current from the fuel cell and the injection duty cycle and the applied injection interval.

DESCRIPTION OF EMBODIMENTS

Figure 1:
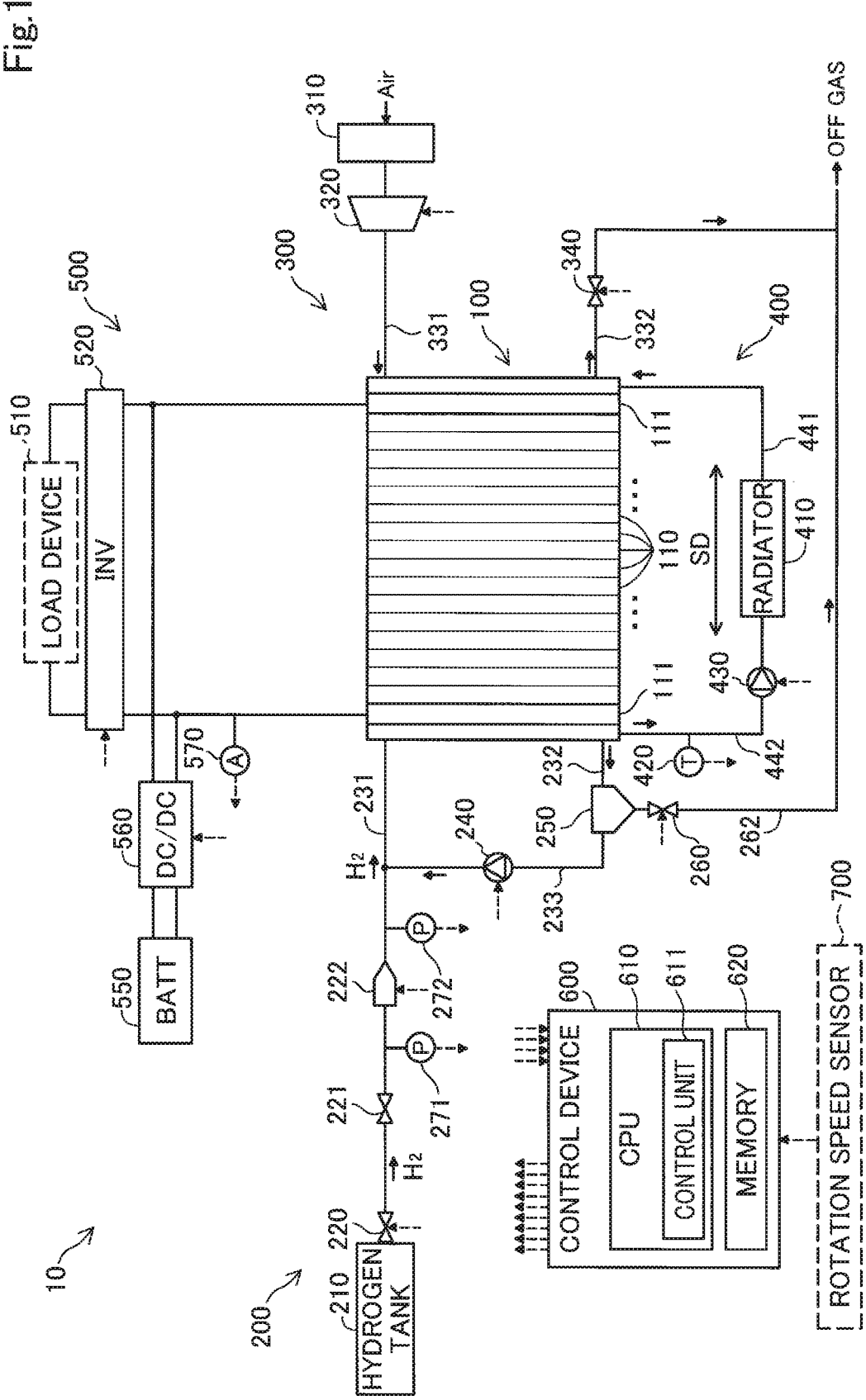
FIG. 1 is a block diagram illustrating a schematic configuration of a fuel cell system according to one embodiment of the present disclosure.

A. Embodiment:

A1. System Configuration:

FIG. 1 is a block diagram illustrating a schematic configuration of a fuel cell system 10 according to one embodiment of the present disclosure. The fuel cell system 10 is installed in a vehicle to supply power to a vehicle driving motor. The fuel cell system 10 includes a fuel cell 100, a fuel gas supply/discharge mechanism 200 (also referred to as a fuel gas supply/discharge system), an oxidizing gas supply/discharge mechanism 300 (also referred to as an oxidizing gas supply/discharge system), a fuel cell circulation cooling mechanism 400 (also referred to as a fuel cell circulation cooling system), a power charge/discharge mechanism 500 (also referred to as a power charge/discharge system), and a control device 600.

The fuel cell 100 is what is known as a polymer electrolyte fuel cell and includes a cell stack and a pair of current collector plates 111 arranged on both ends of the cell stack to function as general electrodes. The cell stack includes a plurality of unit cells 110 stacked along a stacking direction SD. Each of the unit cells 110 generates power through electrochemical reaction between fuel gas (hydrogen gas) and oxidizing gas (oxygen in the air). The fuel gas and the oxidizing gas are respectively supplied to an anode-side catalyst electrode layer (also referred to as an anode electrode) and a cathode-side catalyst electrode layer (also referred to as a cathode electrode) provided to sandwich a solid polymer electrolyte membrane. For example, the catalyst electrode layer includes a catalyst such as carbon particles carrying platinum (Pt) and an electrolyte. A gas diffusion layer, formed of a porous member, is provided on an outer side of each of the catalyst electrode layers on both electrode sides in the unit cell 110. The porous member to be used may be a carbon porous member, such as carbon paper and carbon cloth, or a metal porous member, such as a metal mesh and a metal foam. In the fuel cell 100, a manifold (not illustrated) is formed along the stacking direction SD. The fuel gas, the oxidizing gas, and a coolant flow in the manifold.

The fuel gas supply/discharge mechanism 200 is in charge of supplying the fuel gas to the fuel cell 100 and discharging anode off gas from the fuel cell 100. The fuel gas supply/discharge mechanism 200 includes a hydrogen tank 210, a shutoff valve 220, a pressure regulating valve 221, an injector 222, a gas-liquid separator 250, a circulation pump 240, a purge valve 260, a fuel gas supply path 231, a first fuel gas discharge path 232, a fuel gas circulation path 233, a second fuel gas discharge path 262, a first pressure sensor 271, and a second pressure sensor 272.

The hydrogen tank 210 stores therein high pressure hydrogen, and supplies the hydrogen gas, serving as the fuel gas, to the fuel cell 100 through the fuel gas supply path 231. The shutoff valve 220 is provided at a portion of the hydrogen tank 210 close to a fuel gas supply port, and operates to enable and disable the hydrogen gas supply from the hydrogen tank 210.

The pressure regulating valve 221 is provided on a downstream side of the shutoff valve 220 and on an upstream side of the injector 222, on the fuel gas supply path 231. The pressure regulating valve 221 adjusts (lowers) pressure on its upstream side (primary pressure) to achieve pressure set in advance on its downstream side (secondary pressure). In the present embodiment, the pressure regulating valve 221 is a mechanical valve that performs an operation of opening/closing the fuel gas supply path 231, autonomously (passively) based on a difference between the primary pressure and the secondary pressure. The pressure regulating valve 221 has the following specific configuration. For example, a casing may be formed with a back pressure chamber and a regulating chamber that are separated from each other with a diaphragm, and the primary pressure may be adjusted to be the pressure set in advance (secondary pressure) in the regulating chamber by means of back pressure in the back pressure chamber, as in a known configuration.

The injector 222 is provided on the downstream side of the pressure regulating valve 221 on the fuel gas supply path 231, and injects the hydrogen gas into the fuel cell 100. A supplied amount (flowrate) and pressure of the hydrogen gas thus supplied to the fuel cell 100 are adjusted. A hydrogen gas injection interval and hydrogen gas injection duty cycle (a rate of the hydrogen gas injection time to each interval of the injection interval) of the injector 222 are determined by injection control processing described later.

The gas-liquid separator 250 is provided on the first fuel gas discharge path 232, and separates water from the anode off gas discharged from the fuel cell 100. The water thus separated and the gas (fuel gas) as a result of separating the water are respectively discharged to the second fuel gas discharge path 262 and the fuel gas circulation path 233, from the gas-liquid separator 250. The circulation pump 240 is provided on the fuel gas circulation path 233, and supplies the fuel gas, discharged from the gas-liquid separator 250, to the fuel gas supply path 231. The purge valve 260 is provided on the second fuel gas discharge path 262, and opens to enable the water, as a result of the separation by the gas-liquid separator 250, to be discharged to the atmosphere. The gas-liquid separator 250 is in communication with the fuel cell 100 through the first fuel gas discharge path 232, and is in communication with the atmosphere through the second fuel gas discharge path 262 when the purge valve 260 is open. The pressure in the fuel cell 100 is higher than the atmospheric pressure. Thus, when the purge valve 260 opens, the water remaining in the gas-liquid separator 250 is discharged to the second fuel gas discharge path 262 due to the difference between the pressure in the fuel cell 100 and the atmospheric pressure.

The first pressure sensor 271 measures pressure between the pressure regulating valve 221 and the injector 222 on the fuel gas supply path 231, that is, the secondary pressure of the pressure regulating valve 221. The second pressure sensor 272 measures the downstream pressure of the injector 222 on the fuel gas supply path 231, that is, the pressure between the injector 222 and the fuel cell 100.

The oxidizing gas supply/discharge mechanism 300 is in charge of supplying the oxidizing gas to the fuel cell 100 and discharging cathode off gas from the fuel cell 100. The oxidizing gas supply/discharge mechanism 300 includes an air cleaner 310, an air compressor 320, a back pressure valve 340, an oxidizing gas supply path 331, and an oxidizing gas discharge path 332. The air cleaner 310 uses its internal filter to remove foreign objects such as dust in the air, and supplies the resultant air to the air compressor 320. The air compressor 320 compresses the air supplied from the air cleaner 310, and sends the compressed air to the oxidizing gas supply path 331. The back pressure valve 340 is provided on the oxidizing gas discharge path 332 and adjusts the pressure (what is known as back pressure) on the cathode discharge side in the fuel cell 100. The oxidizing gas discharge path 332 is connected to the second fuel gas discharge path 262 described above. Thus, the water and the cathode off gas discharged through the oxidizing gas discharge path 332 are discharged to the atmosphere together with the water and the anode off gas discharged through the second fuel gas discharge path 262.

The fuel cell circulation cooling mechanism 400 circulates the coolant through the fuel cell 100 to adjust the temperature in the fuel cell 100. The fuel cell circulation cooling mechanism 400 includes a radiator 410, a coolant discharge path 442, a coolant supply path 441, a circulation pump 430, and a temperature sensor 420. The radiator 410 is connected to the coolant discharge path 442 and the coolant supply path 441, and cools the coolant, flowing in from the coolant discharge path 442, by sending wind using an electric fan (not illustrated) or the like. The resultant coolant is discharged to the coolant supply path 441. The coolant discharge path 442 is connected to a coolant discharge manifold in the fuel cell 100. The coolant supply path 441 is connected to a coolant supply manifold in the fuel cell 100. Thus, the coolant discharge path 442, the radiator 410, the coolant supply path 441, and the manifolds in the fuel cell 100 form a coolant circulation path. The temperature sensor 420 is provided at a portion on the coolant discharge path 442 close to the fuel cell 100, and measures the temperature of the coolant discharged from the fuel cell 100. In the present embodiment, water is used as the coolant. Note that the coolant is not limited to water, and may be any heat exchangeable medium such as air and non-freezing water including ethylene glycol.

The power charge/discharge mechanism 500 supplies power output from the fuel cell 100 or a battery 550 to a load device 510. In the present embodiment, the load device 510 is the vehicle driving motor and various auxiliary machines, and is connected to each of the current collector plates 111 of the fuel cell 100 on the anode and the cathode electrode sides. The power charge/discharge mechanism 500 includes an inverter 520, a DC-DC converter 560, the battery 550, and a current sensor 570. The inverter 520 is connected in parallel with the fuel cell 100 and the battery 550, converts direct current supplied from the fuel cell 100 or the battery 550 into alternating current, and supplies the alternating current to the load device 510. The DC-DC converter 560 raises the output voltage from the battery 550, and supplies the resultant voltage to the inverter 520. The DC-DC converter 560 also lowers the output voltage and supplies the resultant voltage to the battery 550, so that an excess amount of the power generated by the fuel cell 100 can be stored. The current sensor 570 measures an output current value from the fuel cell 100 during the power generation operation.

The control device 600 is electrically connected to and controls the shutoff valve 220, the injector 222, the circulation pump 240, the purge valve 260, the air compressor 320, the back pressure valve 340, the circulation pump 430, the inverter 520, and the DC-DC converter 560. The control device 600 is electrically connected to the first pressure sensor 271, the second pressure sensor 272, the temperature sensor 420, and the current sensor 570 and receives signals output from these sensors. The control device 600 receives a signal indicating the rotation speed of the vehicle driving motor, measured by a rotation speed sensor 700 of the vehicle, from the rotation speed sensor 700. The control device 600 includes a microcomputer having a central processing unit (CPU) 610 and a memory 620. The CPU 610 executes a control program, stored in the memory 620, to function as a control unit 611. The control unit 611 executes the injection control processing described later, to control hydrogen gas injection by the injector 222. The memory 620 stores therein an injection interval determination table in advance, as well as the control program described above. The injection interval determination table is described later in detail.

In the fuel cell system 10 having the configuration described above, when the injector 222 injects the hydrogen gas, pressure on the upstream side of the injector 222, that is, the secondary pressure of the pressure regulating valve 221 drops. Thus, the pressure regulating valve 221 autonomously (passively) operates to open the fuel gas supply path 231, so that the secondary pressure can be maintained at the predetermined pressure. Thus, the pressure regulating valve 221 performs the opening/closing operation, for the fuel gas supply path 231, linked with the hydrogen gas injection by the injector 222. The opening/closing operation of the pressure regulating valve 221 involves wearing of a portion of the pressure regulating valve 221 that comes into contact with other portions during the opening/closing operation. Furthermore, a sealing portion is damaged as a result of pressure repeatedly rising and dropping. Thus, a predetermined upper limit operation count is set for the pressure regulating valve 221. The upper limit operation count is set as a predetermined operation count relative to a predetermined traveling distance of the vehicle. Specifically, in the present embodiment, the upper limit operation count is set in advance as "55 million times relative to the traveling distance of 200 thousand kilometers". The "predetermined traveling distance" for the upper limit operation count is not limited to 200 thousand kilometers, and may be any appropriate distance. The "predetermined upper limit operation count" is not limited to 55 million times, and may be any appropriate number of times. In the present embodiment, the upper limit operation count of the pressure regulating valve 221 is also simply referred to as an "upper limit operation count".

In the fuel cell system 10, the injection control processing described later is executed so that hydrogen gas injection by the injector 222 is controlled to prevent fuel efficiency of reaction gas from being compromised while preventing the total operation count of the pressure regulating valve 221 from exceeding the upper limit operation count.

Figure 2:
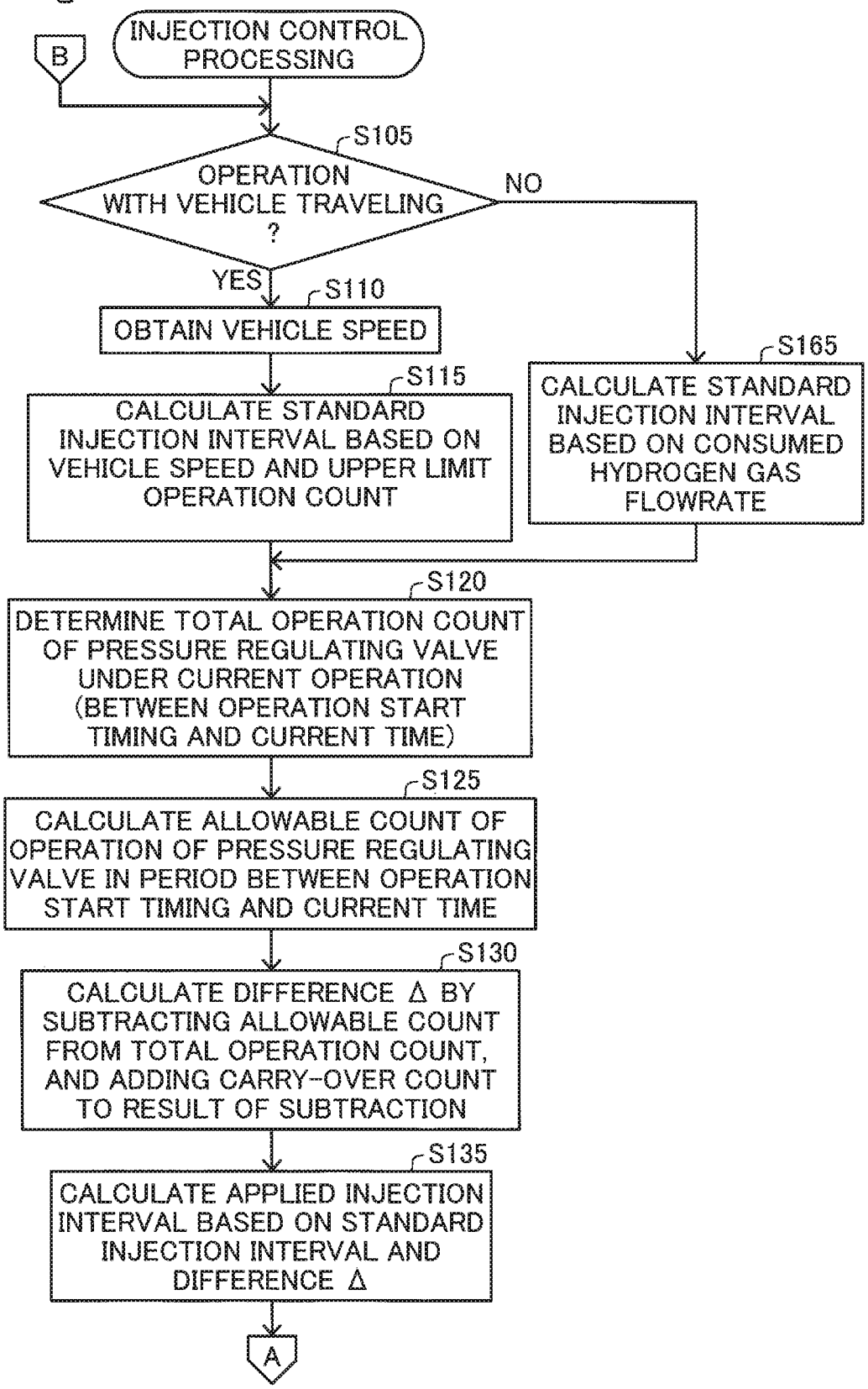
FIG. 2 is a flowchart illustrating processes in the injection control processing executed in the fuel cell system.
Figure 3:
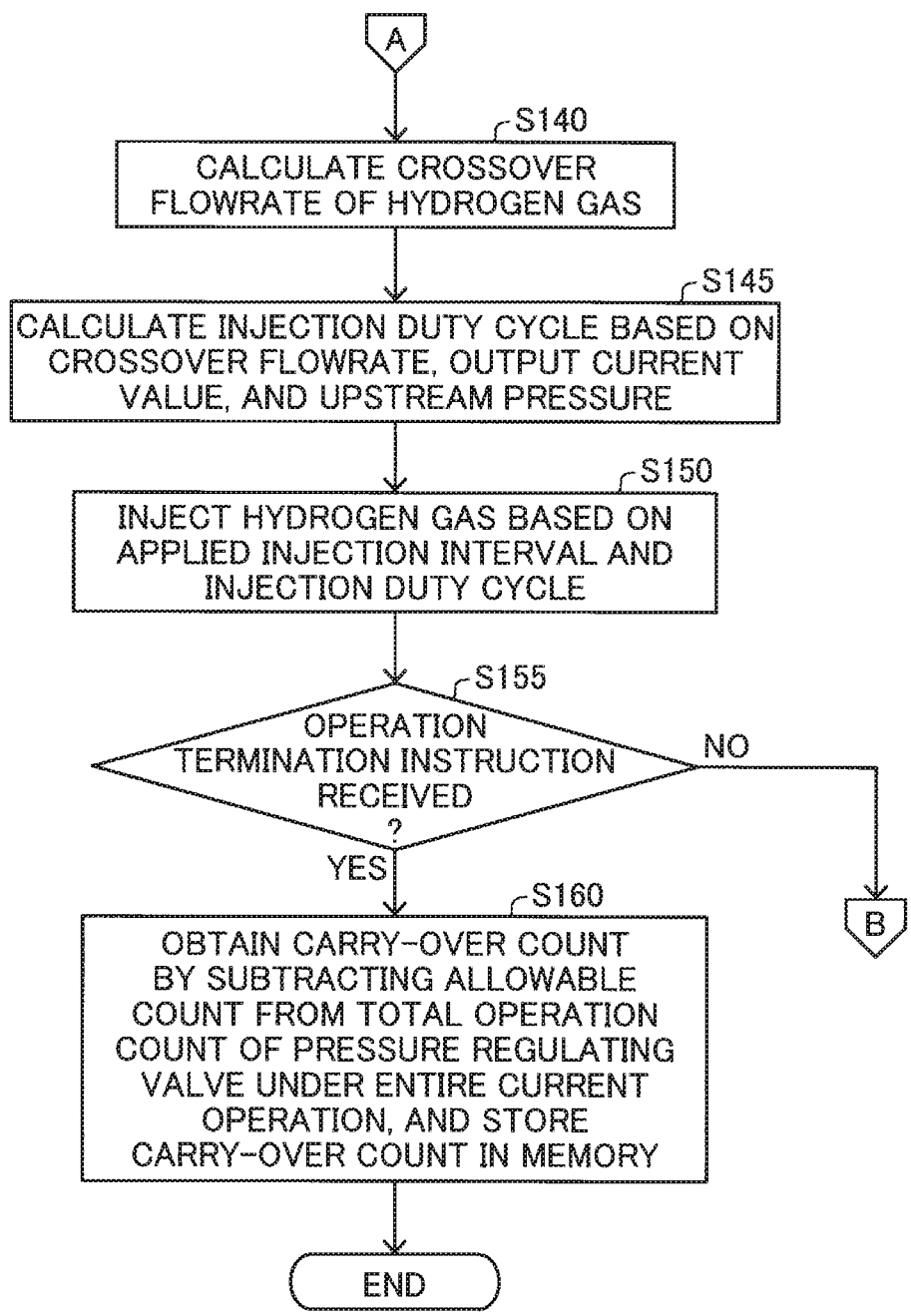
FIG. 3 is a flowchart illustrating processes in the injection control processing executed in the fuel cell system.

A2. Injection Control Processing:

FIG. 2 and FIG. 3 are each a flowchart illustrating processes in the injection control processing executed in the fuel cell system 10. When the fuel cell system 10 starts operating, the injection control processing is executed in the fuel cell system 10. The injection control processing is processing of controlling injection by the injector 222, and is mainly executed by the control unit 611.

The control unit 611 determines whether the operation of the fuel cell system 10 that has started is performed with the vehicle traveling (step S105). The fuel cell system 10 operates with the vehicle traveling, that is, for supplying power to the vehicle driving motor, and may also operate with the vehicle not traveling. For example, water discharge scavenging processing may be executed for discharging water, remaining in the fuel cell 100, the oxidizing gas discharge path 332, and the like, while the vehicle is stopped (parked). In such a case, the fuel cell system 10 may be operated to supply power to auxiliary machines involved in the scavenging processing such as the injector 222 and the circulation pump 240. For example, the fuel cell system 10 may also be operated to supply power to external devices, such as electric appliances for example, while the vehicle is stopped (parked). In the present embodiment, the control unit 611 obtains the vehicle speed from the rotation speed of the vehicle driving motor, measured by a rotation speed sensor 700, and determines whether the fuel cell system 10 is operating with the vehicle traveling, based on the vehicle speed. Specifically, when the vehicle speed is not zero, or when a state where the vehicle speed is zero is not maintained for a predetermined period of time, the operation is determined to be performed with the vehicle traveling. When the state where the vehicle speed is zero is maintained for a predetermined period of time, the operation is determined to be performed with the vehicle not traveling. The predetermined period of time may be set to be three minutes, five minutes, or any other period of time long enough to determine that the vehicle is stopped (parked). Information indicating a traveling state of the vehicle may be received from an Electronic Control Unit (ECU) in charge of traveling control in the vehicle. Thus, the traveling state, including traveling, a temporarily stopped state during traveling, and a parked state, can be identified. Then, whether the operation of the fuel cell system 10 is performed with the vehicle traveling may be determined based on the traveling state thus identified.

The control unit 611 receives the rotation speed of the vehicle driving motor measured by the rotation speed sensor 700, and obtains the vehicle speed based on the rotation speed (step S110). Note that step S110 may be omitted, and thus the vehicle speed used for the determination in step S105 may be obtained as the vehicle speed. Still, with the vehicle speed obtained again in step S110 as in the present embodiment, the injection interval described later can be accurately obtained.

The control unit 611 calculates a standard injection interval of the injector 222 based on the vehicle speed obtained in step S110 and the upper limit operation count (step S115). The standard injection interval is an interval (seconds) with which the hydrogen gas can be continuously injected without exceeding the upper limit operation count, assuming that the current vehicle speed of the vehicle is maintained. More specifically, the control unit 611 obtains a standard injection interval T0 with the following Formula (1).

$$T0 = \text{MIN}(55 \text{ million times}/(200 \text{ thousand kilometers} \times 1000) \times 1/v, T\text{max}) \quad (1)$$

In Formula (1) described above, v represents the vehicle speed (m/s) and Tmax represents a predetermined maximum interval set for a case where the vehicle speed v is zero. When the operation is performed with the vehicle traveling, the vehicle speed might drop to zero with the vehicle temporarily stopping at an intersection or the like for example. In this event, the value of 1/v in Formula (1) described above becomes infinity. The interval Tmax is set in advance to be used in such a case. As described above, the operation of the pressure regulating valve 221 is linked with the hydrogen gas injection by the injector 222. Thus, with the hydrogen gas injected by the injector 222 at an interval not longer than the standard injection interval obtained by Formula (1) described above, the total operation count of the pressure regulating valve 221 can be prevented from exceeding the upper limit operation count.

The control unit 611 determines the total operation count of the pressure regulating valve 221 under the current operation, that is, counted during a period between the start of the current operation of the fuel cell 100 and the current time point (step S120). As described above, the pressure regulating valve 221 autonomously (passively) operates to maintain the secondary pressure at predetermined pressure. In the present embodiment, the control unit 611 counts the number of times a threshold is exceeded by the difference between the value of the predetermined secondary pressure and the pressure detected by the first pressure sensor 271, that is, an actual measurement value of the secondary pressure. Thus, the total operation count of the pressure regulating valve 221 under the current operation is identified.

The control unit 611 calculates an allowable operation count of the pressure regulating valve 221 under the current operation at the current time point (step S125). The allowable count is an upper limit value of the injection count obtained under an assumption that the injection is performed at the standard injection interval, calculated in step S115, in the vehicle that has traveled for the current traveling distance under the current operation. Thus, the value can be regarded as the upper limit value of the operation count of the pressure regulating valve 221. In other words, the value can be regarded as the operation count of the pressure regulating valve 221 corresponding to the injection count allowable with the injection performed without exceeding the standard injection interval up until the current point under the current operation. In the present embodiment, the current traveling distance under the current operation is obtained by integrating each vehicle speed identified in step S110, and accumulating the obtained values. The current traveling distance under the current operation may also be identified as the traveling distance during the current trip acquired from the traveling control ECU.

When the "55 million times relative to the traveling distance of 200 thousand kilometers" is set in advance as the upper limit operation count as described above, an average operation count per meter is 0.275 (times/meter). Thus, the allowable count can be calculated by multiplying the determined current traveling distance (meter) under the current operation by this value 0.275 (times/meter).

The control unit 611 subtracts the allowable count calculated in step S125 from the total operation count determined in step S120, and adds a carry-over count to the resultant value to calculate a difference Δ (step S130). The carry-over count corresponds to the difference Δ under the previous operation, and will be described in detail later. When a state where the total operation count exceeds the allowable count without adding the carry-over count continues, the upper limit operation count of the pressure regulating valve 221 is overwhelmed. Thus, the difference Δ is preferably a negative value. When the "upper limit operation count is overwhelmed" as described above, the predetermined upper limit operation count, which is 50 million times, is exceeded with a traveling distance shorter than the predetermined distance which is 200 thousand kilometers.

The control unit 611 calculates an injection interval to be applied to the injector 222 (hereinafter, referred to as an "applied injection interval") based on the standard injection interval calculated in step S115 and the difference Δ calculated in step S130 (step S135). Specifically, the control unit 611 calculates an applied injection interval Ts with the following Formula (2).

$$Ts = T0 \times (1 + \Delta/10) \quad (2)$$

In Formula (2) described above, T0 represents the standard injection interval, and Δ represents the difference Δ. Thus, in Formula (2), the applied injection interval Ts is calculated by incrementing or decrementing the standard injection interval T0 by the value obtained by multiplying the standard injection interval T0 by 10% of the difference Δ. As expressed in Formula (2), when the difference Δ is a negative value, that is, when a sum of the total operation count and the carry-over count (the difference Δ under the previous operation) does not exceed the allowable count, the applied injection interval Ts is shorter than the standard injection interval T0. When the difference Δ is a positive value, that is, when the sum of the total operation count and the carry-over count (the difference Δ under the previous operation) exceeds the allowable count, the applied injection interval Ts is longer than the standard injection interval T0. With the applied injection interval Ts thus being longer than the standard injection interval T0, the injector 222 performs injection at a low frequency, whereby the total operation count of the pressure regulating valve 221 can be prevented from exceeding the upper limit operation count. An effect of the applied injection interval Ts being shorter than the standard injection interval T0 with the total operation count of the pressure regulating valve 221 not exceeding the allowable count is described below with reference to FIG. 4.

Figure 4:
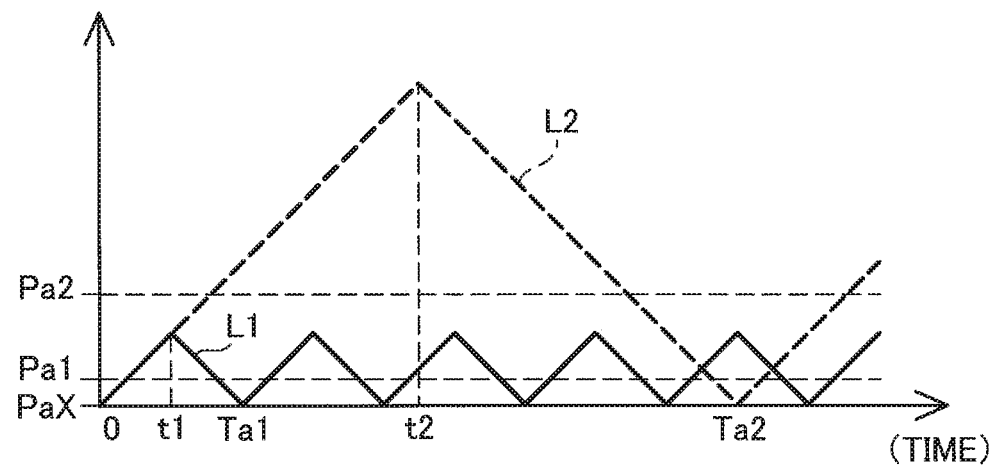
FIG. 4 is a diagram illustrating relationship between the applied injection interval and the pressure on the downstream side of the injector.

FIG. 4 is a diagram illustrating relationship between the applied injection interval and the pressure on the downstream side of the injector 222. In FIG. 4, the horizontal axis represents time, and the vertical axis represents the pressure on the downstream side of the injector 222 (hereinafter, simply referred to as "downstream pressure"). A solid polygonal line L1 schematically represents transition of the downstream pressure with an applied injection interval Ta1, and a broken polygonal line L2 schematically represents transition of the downstream pressure with an applied injection interval Ta2 (>Ta1).

As indicated by the polygonal line L1 in FIG. 4, when the injector 222 starts the injection at the applied injection interval Ta1 at a time point 0, the downstream pressure rises from pressure PaX, and then starts to drop when the injector 222 stops the injection at a time point t1 (Ta1/2) to return to the pressure PaX at a time point Ta1. The pressure PaX represents the pressure at which an amount of the hydrogen gas, required for the fuel cell 100 to generate power, can be supplied. As indicated by the polygonal line L2 in FIG. 4, when the injector 222 starts the injection at the applied injection interval Ta2 at the time point 0, the downstream pressure rises from the pressure PaX, and then starts to drop when the injector 222 stops the injection at a time point t2 (Ta2/2) to return to the pressure PaX at a time point Ta2.

With the applied injection interval Ta1, a period (a period between the time point 0 and the time point t1) between injection start and end timings of the injector 222 is relatively short. Thus, a peak value of the downstream pressure, that is, a pressure value at the time point t1 at which the injector 222 stops the injection is much smaller than that with the applied injection interval Ta2. Thus, pressure Pa1 that is a time average value of the downstream pressure obtained with the applied injection interval Ta1 is lower than pressure Pa2 that is a time average value of the downstream pressure obtained with the applied injection interval Ta2. A smaller time average value of the downstream pressure leads to lower anode-side hydrogen partial pressure in the fuel cell 100, resulting in a small difference between the anode-side hydrogen partial pressure and the cathode-side hydrogen partial pressure. Such a small pressure difference can achieve a low flowrate (hereinafter, referred to as a "crossover flowrate") of the hydrogen gas moving from the anode side to the cathode gas through the electrolyte membrane in each unit cell 110. The hydrogen gas moving at the crossover flowrate does not contribute to the electrochemical reaction in the fuel cell 100. Thus, the fuel efficiency can be prevented from being compromised by reducing the crossover flowrate. All things considered, the fuel efficiency can be prevented from being compromised, with the applied injection interval Ts set to be shorter than standard injection interval T0.

As illustrated in FIG. 3, after step S135 for calculating the applied injection interval Ts, the control unit 611 calculates the crossover flowrate of the hydrogen gas (step S140). The crossover flowrate is proportional to the difference between the anode-side hydrogen partial pressure and the cathode-side hydrogen partial pressure. Thus, in the present embodiment, the control unit 611 calculates the crossover flowrate by obtaining the difference between the hydrogen partial pressure on the anode and the cathode side, and multiplying the pressure difference by a proportionality constant. The anode-side hydrogen partial pressure is obtained by subtracting partial pressure of gas other than hydrogen from the downstream pressure measured by the second pressure sensor 272. Partial pressure of water (water vapor), which is one example of the partial pressure of gas other than hydrogen, may be obtained from an amount of saturated water vapor identified based on the temperature measured by the temperature sensor 420. Partial pressure of nitrogen may be estimated with a known method. In the present embodiment, the crossover flowrate is calculated with the cathode-side hydrogen partial pressure regarded as being zero.

The control unit 611 calculates an injection duty cycle based on the crossover flowrate calculated in step S140, an output current value of the fuel cell 100, and pressure on the upstream side of the injector 222 (step S145). Specifically, an injection duty cycle Dy is calculated with the following Formula (3).

$$Dy = \text{(flowrate of hydrogen gas required in fuel cell 100)/(amount of hydrogen gas that can be supplied by injector 222)} \quad (3)$$

The numerator "flowrate of hydrogen gas required in fuel cell 100" in the right side of Formula (3) described above corresponds to a sum of the flowrate of the hydrogen gas used in the electrochemical reaction in the fuel cell 100 and the crossover flowrate. The "flowrate of the hydrogen gas used in the electrochemical reaction in the fuel cell 100" is proportional to the output current value of the fuel cell 100. Thus, the control unit 611 calculates the "flowrate of the hydrogen gas used in the electrochemical reaction in the fuel cell 100" by multiplying the current value measured by the current sensor 570 by a predetermined proportionality constant. The denominator "amount of hydrogen gas that can be supplied by injector 222" in the right side of Formula (3) described above is proportional to the pressure on the upstream side of the injector 222. Thus, the control unit 611 calculates the "amount of hydrogen gas that can be supplied by injector 222" by multiplying the pressure on the upstream side of the injector 222, measured by the first pressure sensor 271, by a predetermined proportionality constant.

The control unit 611 causes the injector 222 to inject the hydrogen gas based on the applied injection interval calculated in step S135 and the injection duty cycle calculated in step S145 (step S150). The total injection time per applied injection interval is determined by multiplying the applied injection interval by the injection duty cycle.

FIG. 5 is a diagram illustrating relationship between levels of the vehicle speed and the output current from the fuel cell and the injection duty cycle and the applied injection interval. In FIG. 5, total of two levels (high and low) are prepared for the vehicle speed, and total of two levels (large and small) are prepared for the current. The levels of the output current represent the amount of hydrogen gas required for the chemical reaction in the fuel cell 100.

As illustrated in FIG. 5, the injection interval is set to be shorter in a case where the vehicle speed is high than in a case where the vehicle speed is low. Thus, a low crossover flowrate can be achieved, whereby the fuel efficiency can be prevented from being compromised. When the vehicle speed is low, the injection interval is set to be long. Also in this case, the total operation count of the pressure regulating valve 221 can be prevented from reaching the upper limit operation count. As illustrated in FIG. 5, when the output current value is large, that is, when a larger amount of hydrogen gas is required for the chemical reaction in the fuel cell 100, the injection duty cycle is long. Thus, even when the vehicle speed is low and the applied injection interval is long, a required amount of hydrogen gas can be supplied to the fuel cell 100 due to a long injection duty cycle.

Referring back to FIG. 3, after step S150, the control unit 611 determines whether an operation termination instruction has been received (step S155). The operation termination instruction is transmitted from the traveling control ECU, for example. Alternatively, when the driver of the vehicle presses an operation button, such as a stop button for example, on an instrument panel or the like, the instruction is received as a signal indicating that the button has been pressed. When it is determined that the operation termination instruction has not been received (step S155: NO), the processing returns to step S105 in FIG. 2 described above.

On the other hand, when it is determined that the operation termination instruction has been received (step S155: YES), the control unit 611 subtracts the allowable count from the total operation count of the pressure regulating valve 221 under the entire current operation instructed to be terminated. The resultant count is stored as the carry-over count in the memory 620 (step S160). The carry-over count thus stored in the memory 620 is read in step S130 described above to be used. If the allowable count has not been reached by the total operation count of the pressure regulating valve 221 under the current operation, the upper limit operation count is prevented from being overwhelmed even when the allowable count, corresponding to a difference between these counts, is added for the subsequent operation or after. After step S160, the injection control processing is terminated.

In step S105 in FIG. 2 described above, when the operation of the fuel cell system 10 that has started is determined to be performed with the vehicle not traveling (step S105: NO), the control unit 611 refers to the injection interval determination table stored in the memory 620 and calculates the standard injection interval based on the consumed hydrogen gas flowrate (step S165).

Figure 6:
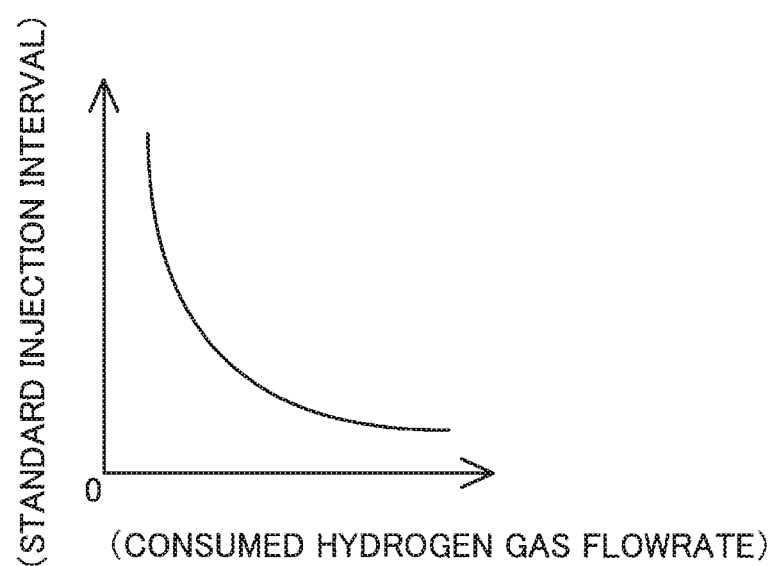
FIG. 6 is a diagram schematically illustrating the setting in the injection interval determination table.

FIG. 6 is a diagram schematically illustrating the setting in the injection interval determination table. As illustrated in FIG. 6, in the injection interval determination table, the consumed hydrogen gas flowrate and the standard injection interval are set to be associated with each other. More specifically, the standard injection interval is set to exponentially decrease as the consumed hydrogen flowrate increases. The consumed hydrogen gas flowrate is obtained in a manner that is the same as that for obtaining the numerator (flowrate of hydrogen gas required in fuel cell 100) in the right side of Formula (3) described above used for calculating the injection duty cycle in step S145 described above.

After step S165, the processes in step S120 described above and after are executed. When the process in step S165 is executed, that is, when the operation of the fuel cell system 10 started is performed with the vehicle not traveling, the vehicle speed is zero in the calculation to obtain the allowable count in the subsequent step S125. Thus, the traveling distance in the current trip is regarded as zero. Thus, the allowable count is calculated by multiplying the traveling distance, which is zero, by 0.275 (times/m) described above, and thus is zero. Then, in the subsequent step S130, the allowable count is subtracted from the total operation count, and the carry-over count is added to the resultant value to obtain the difference Δ. In this calculation, the difference Δ is likely to be a positive value because the allowable count is zero. Thus, in the subsequent step S135, the applied injection interval Ts calculated with Formula (2) described above is likely to be longer than the standard injection interval T0. In the subsequent step S160, the carry-over count is calculated with the allowable count of zero subtracted. Thus, the total operation count during the entire current operation remains to be the same, whereby a carry-over count of a relatively large positive value is stored in the memory 620. This carry-over count of a relatively large positive value is added in step S130 in the subsequent operation performed with the vehicle traveling, whereby the difference Δ may become relatively large. Thus, a relatively long applied injection interval Ts is calculated in step S135 with Formula (2) described above. As described above, also when the operation is performed with the vehicle not traveling, the applied injection interval is calculated for the subsequent operation for the traveling vehicle or after, based on the operation count of the pressure regulating valve 221 under the operation performed with the vehicle not traveling. All things considered, the total operation count of the pressure regulating valve 221 can be prevented from reaching the upper limit operation count.

In the fuel cell system 10 according to the embodiment described above, the control unit 611 calculates the injection interval of the injector 222 based on the upper limit operation count of the pressure regulating valve 221 to control the injector 222. Thus the fuel efficiency of the reaction gas can be prevented from being compromised, and the total operation count of the pressure regulating valve 221 can be prevented from exceeding the upper limit operation count. The control unit 611 calculates the applied injection interval of the injector 222 based on the vehicle speed. Thus, the total operation count of the pressure regulating valve 221 can be accurately prevented from exceeding the allowable count of the pressure regulating valve 221, that is, the upper limit operation count. All things considered, the total operation count of the pressure regulating valve 221 can be accurately prevented from exceeding the upper limit operation count even when the traveling conditions of the vehicle related to the weight of passengers and luggage and the like change.

The control unit 611 calculates the allowable count of the operation of the pressure regulating valve 221 during the current operation (an operation period between an operation start timing and the current time point) based on the vehicle speed and the upper limit operation count. Then, the allowable count is compared with the total operation count. The injection interval calculated is corrected based on the result of comparison, whereby the total operation count of the pressure regulating valve 221 can be accurately prevented from exceeding the upper limit operation count.

The difference Δ between the total operation count and the allowable count is added for obtaining the total operation count for the subsequent operation and after starting after the current operation is terminated. Thus, the total operation count of the pressure regulating valve 221 can be accurately prevented from exceeding the upper limit operation count, and can also be prevented from being much smaller than the upper limit operation count. Thus, the fuel efficiency can be more accurately prevented from being compromised with the injection interval of the injector 222 prevented from being excessively long.

The hydrogen gas injection time of the injector 222 per injection interval is calculated based on the crossover flowrate, the output power value from the fuel cell 100, and the pressure measured by the first pressure sensor 271. Thus, the injector 222 can inject and supply a required amount of reaction gas for the electrochemical reaction in the fuel cell 100 with the injection interval set to accurately prevent the total operation count of the pressure regulating valve 221 from exceeding the upper limit operation count.

B. Modifications:

B1. Modification 1:

In the embodiment described above, in step S135, the applied injection interval Ts is calculated by incrementing or decrementing the standard injection interval T0 by a value that is obtained by multiplying the standard injection interval T0 by 10% of the difference Δ in the previous operation. However, the present disclosure is not limited to this. For example, the percentage of the difference Δ by which the standard injection interval T0 is multiplied is not limited to 10%. The applied injection interval Ts may be calculated by incrementing or decrementing the standard injection interval T0 by a value obtained by multiplying the standard injection interval T0 by any appropriate percentage of the difference Δ.

B2. Modification 2:

In the embodiment described above, the difference Δ in the current operation is used as the carry-over count to calculate the applied injection interval Ts for the subsequent operation. However, the present disclosure is not limited to this. For example, the difference Δ in the current operation may be discarded instead of being used as the carry-over count, so as not to be added for calculation to obtain the difference in the subsequent operation or after. Also in this configuration, the injection interval is adjusted so that the allowable count is not exceeded in the current operation. Thus, the total operation count of the pressure regulating valve 221 can be prevented from exceeding the upper limit operation count. Furthermore, when the difference Δ is a negative value, the carry-over count may be set to be zero. Also in this configuration, the injection interval is not shortened, whereby the upper limit operation count can be prevented from being exceeded with the injection frequency reduced.

B3. Modification 3:

In the embodiment described above, the injection duty cycle (total injection time per applied injection interval) is calculated with the flowrate of the hydrogen gas required in the fuel cell 100 obtained as the sum of the flowrate of the hydrogen gas used for the electrochemical reaction in the fuel cell 100 and the crossover flowrate. Alternatively, the crossover flowrate may be omitted, and the injection duty cycle (total injection time per applied injection interval) may be calculated with the flowrate of the hydrogen gas required in the fuel cell 100 obtained as the flowrate of the hydrogen gas used for the electrochemical reaction in the fuel cell 100.

B4. Modification 4:

In the embodiment described above, the fuel cell system 10 is installed in a vehicle. However, the mobile body including the fuel cell system 10 is not limited to the vehicle, and may be any other mobile bodies such as a ship, an aircraft, and a robot. Also in such configurations, if the mobile body has the injection device with a predetermined upper limit operation count of the pressure regulating valve set with respect to a predetermined traveling distance, injection by the injection device can be controlled so that the operation count does not exceed the upper limit operation count.

B5. Modification 5:

In the embodiment described above, the vehicle speed is obtained from the rotation speed of the vehicle driving motor measured by the rotation speed sensor 700. However, the present disclosure is not limited to this. For example, in a configuration including a vehicle speed sensor instead of the rotation speed sensor 700, the vehicle speed may be measured by the vehicle speed sensor to be obtained. Thus, the fuel cell system according to the present disclosure may employ the following configuration. Specifically, the moving speed may be determined based on a value obtained from a sensor that acquires a parameter generally correlated with the moving speed of a mobile body, and the injection interval of the injection device may be calculated based on the moving speed thus determined.

B6. Modification 6:

The configurations implemented by hardware in the embodiment described above may be partially replaced with software. The configurations implemented by software in the embodiment described above may be partially replaced with hardware. For example, the control unit 611 may be implemented with an integrated circuit, a discrete circuit, or a module combining these circuits. If the functions according to the present disclosure are partially or entirely implemented by software, the software (computer program) may be provided while being stored in a computer-readable storage medium. This "computer-readable storage medium" is not limited to portable recording media, such as a flexible disk or a CD-ROM, and includes various internal storage devices (such as a RAM or a ROM) in a computer and various external storage devices (such as a hard disk fixed to a computer). Thus, the "computer-readable storage medium" is a broad concept including any storage medium that can hold data packets in a non-transitory manner.

The disclosure is not limited to any of the embodiments and the modifications described above but may be implemented by a diversity of other configurations without departing from the scope of the disclosure. For example, the technical features of any of the embodiments and the modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) According to one aspect of the present disclosure, there is provided a fuel cell system installed in a mobile body. The fuel cell system comprises a fuel cell configured to generate power by using reaction gas; a gas supply flow path through which the reaction gas is supplied to the fuel cell; an injection device configured to be provided on the gas supply flow path and to inject the reaction gas; a pressure regulating valve configured to be provided more on an upstream side than the injection device on the gas supply flow path, and to autonomously perform an opening/closing operation in accordance with a difference between pressure between the pressure regulating valve and the injection device on the gas supply flow path and pressure on an upstream side of the pressure regulating valve; and a control unit configured to control injection of the reaction gas by the injection device. The control unit may calculates an injection interval of the injection device based on an upper limit operation count of the pressure regulating valve set in advance with respect to a predetermined traveling distance of the mobile body.

In this fuel cell system according to this aspect, the control unit calculates the injection interval of the injection device based on the predetermined upper limit operation count of the pressure regulating valve with respect to the predetermined traveling distance of the mobile body to control the injection device, thus the fuel efficiency of the reaction gas can be prevented from being compromised while preventing the total operation count of the pressure regulating valve from exceeding the upper limit operation count of the pressure regulating valve.

(2) In the fuel cell system of the above aspect, the control unit may obtain moving speed of the mobile body based on a value obtained from a sensor that acquires a parameter correlated with the moving speed, and may calculate the injection interval of the injection device based on the moving speed obtained. In the fuel cell of this aspect, the control unit calculates the injection interval of the injection device based on the moving speed of the mobile body, and thus the total operation count of the pressure regulating valve can be accurately prevented from exceeding the allowable count, that is, the predetermined upper limit operation count with respect to the predetermined traveling distance. Thus, the total operation count of the pressure regulating valve can be accurately prevented from exceeding the upper limit operation count even when the traveling conditions of the mobile body related to the weight of passengers and luggage and the like change.

(3) In the fuel cell system according to the above aspect, the control unit may obtain a total operation count of the pressure regulating valve in the fuel cell system in operation, during an operation period between a timing at which the operation has started and a current time point. The control unit may calculate an allowable count of the pressure regulating valve during the operation period, based on the moving speed obtained and the upper limit operation count. The control unit may compare the total operation count and the allowable count, and corrects the calculated injection interval based on a result of the comparison. In the fuel cell of this aspect, the control unit calculates the allowable count of the pressure regulating valve during the operation period between the timing at which the operation has started and the current time point based on the moving speed obtained and the upper limit operation count, compares the total operation count and the allowable count, and corrects the calculated injection interval based on a result of the comparison. Thus, the total operation count of the pressure regulating valve can be accurately prevented from exceeding the upper limit operation count.

(4) In the fuel cell system according to the above aspect, when the total operation count during the entire operation period exceeds the allowable count during the entire operation period at a time point when the operation is terminated, the control unit adds a difference between the total operation count and the allowable count for obtaining the total operation count for a subsequent operation or after, the subsequent operation starting after the operation is terminated. In the fuel cell of this aspect, the difference between the total operation count and the allowable count is added for obtaining the total operation count for a subsequent operation or after, the subsequent operation starting after the operation is terminated. Thus, the total operation count of the pressure regulating valve can be accurately prevented from exceeding the upper limit operation count, and can also be prevented from being much smaller than the upper limit operation count. Thus, the fuel efficiency can be more accurately prevented from being compromised with the injection interval of the injection device prevented from being excessively long.

(5) In the fuel cell system according to the above aspect further comprises a current sensor configured to measure an output current value of the fuel cell; and pressure sensor configured to measure the pressure on the upstream side of the injection device. The fuel cell includes an anode electrode, a cathode electrode, and an electrolyte membrane provided between the anode electrode and the cathode electrode. The control unit calculates a crossover flowrate representing an amount of the reaction gas that transmits through the electrolyte membrane from one of the anode electrode and the cathode electrode from which the reaction gas is supplied in the fuel cell to another one of the anode electrode and the cathode electrode, and calculates an injection time of the injection device during which the reaction gas is injected in each interval of the injection interval based on the crossover flowrate calculated, the output current value measured by the current sensor, and the pressure measured by the pressure sensor. In the fuel cell of this aspect, the injection time of the injection device during which the reaction gas is injected in each interval of the injection interval is calculated based on the crossover flowrate, the output current value, and the pressure measured by the pressure sensor. Thus, the injection device can inject and supply a required amount of reaction gas for the electrochemical reaction in the fuel cell with the injection interval set to accurately prevent the total operation count of the pressure regulating valve from exceeding the upper limit operation count.

The present disclosure can be implemented with various aspects. For example, the present disclosure can be implemented as an injection control method for controlling injection by the injection device used in the fuel cell system according to the various aspects described above, a computer program for implementing such a method, and a non-transitory computer readable storage medium that stores therein such a computer program.

What is claimed is:

1. A fuel cell system installed in a mobile body, the fuel system comprising:
   a fuel cell configured to generate power by using reaction gas;
   a gas supply flow path through which the reaction gas is supplied to the fuel cell;
   an injection device configured to be provided on the gas supply flow path and to inject the reaction gas;
   a pressure regulating valve configured to be provided more on an upstream side than the injection device on the gas supply flow path, and to autonomously perform an opening/closing operation in accordance with a difference between pressure between the pressure regulating valve and the injection device on the gas supply flow path and pressure on an upstream side of the pressure regulating valve; and
   a control unit programmed to control injection of the reaction gas by the injection device, wherein
   the control unit is programmed to:
      calculate an injection interval of the injection device based on an upper limit operation count of the pressure regulating valve set in advance with respect to a predetermined traveling distance of the mobile body, such that the injection interval is set to be shorter in a case where a moving speed of the mobile body is high, and
      determine the injection interval and an injection duty cycle such that the injection duty cycle is long when an output current value of the fuel cell is large.

2. The fuel cell system according to claim 1, wherein the control unit is programmed to:
   obtain the moving speed of the mobile body based on a value obtained from a sensor that acquires a parameter correlated with the moving speed, and
   calculate the injection interval of the injection device based on the moving speed obtained.

3. The fuel cell system according to claim 2, wherein the control unit is programmed to:
obtain a total operation count of the pressure regulating valve in the fuel cell system in operation, during an operation period between a timing at which the operation has started and a current time point,
calculate an allowable count of the pressure regulating valve during the operation period, based on the moving speed obtained and the upper limit operation count, and
compare the total operation count and the allowable count, and correct the calculated injection interval based on a result of the comparison.

4. The fuel cell system according to claim 3,
wherein when the total operation count during the entire operation period exceeds the allowable count during the entire operation period at a time point when the operation is terminated, the control unit is programmed to add a difference between the total operation count and the allowable count for obtaining the total operation count for a subsequent operation or after, the subsequent operation starting after the operation is terminated.

5. The fuel cell system according to claim 1, further comprising:
a current sensor configured to measure the output current value of the fuel cell; and
a pressure sensor configured to measure the pressure on the upstream side of the injection device, wherein
the fuel cell includes an anode electrode, a cathode electrode, and an electrolyte membrane provided between the anode electrode and the cathode electrode, and
the control unit is programmed to:
calculate a crossover flowrate representing an amount of the reaction gas that transmits through the electrolyte membrane from one of the anode electrode and the cathode electrode from which the reaction gas is supplied in the fuel cell to another one of the anode electrode and the cathode electrode, and
calculate an injection time of the injection device during which the reaction gas is injected in each interval of the injection interval based on the crossover flowrate calculated, the output current value measured by the current sensor, and the pressure measured by the pressure sensor.

6. The fuel cell system according to claim 1, wherein the control unit is programmed to:
obtain a total operation count of the pressure regulating valve in the fuel cell system in operation, during an operation period between a timing at which the operation has started and a current time point,
calculate an allowable count of the pressure regulating valve during the operation period, based on the moving speed of the mobile body and the upper limit operation count of the pressure regulating valve, and
when the total operation count during the entire operation period does not exceed the allowable count during the entire operation period at a time point when the operation is terminated, subtract a difference between the total operation count and the allowable count to obtain the total operation count for a subsequent operation or after, the subsequent operation starting after the operation is terminated.

7. The fuel cell system according to claim 1, wherein the control unit is programmed to:
determine whether operation of the fuel cell system is performed with the mobile body traveling, and
when it is determined that operation of the fuel cell system is not performed with the mobile body traveling, calculate a standard injection interval based on a consumed hydrogen gas flowrate, wherein the standard injection interval exponentially decreases as the consumed hydrogen flowrate increases.

* * * * *